(12) United States Patent  
Tomikawa et al.

(10) Patent No.: US 10,866,445 B2  
(45) Date of Patent: Dec. 15, 2020

(54) DISPLAY DEVICE AND LIQUID CRYSTAL DEVICE

(71) Applicant: SEIKO EPSON CORPORATION, Tokyo (JP)

(72) Inventors: Naoki Tomikawa, Suwa-gun (JP); Kazu Kobayashi, Kai (JP); Mitsutaka Ohori, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1 day.

(21) Appl. No.: 16/189,483

(22) Filed: Nov. 13, 2018

(65) Prior Publication Data

US 2019/0146265 A1 May 16, 2019

(30) Foreign Application Priority Data

Nov. 14, 2017 (JP) ................................ 2017-218828

(51) Int. Cl.
*G02F 1/1333* (2006.01)
*G02F 1/1343* (2006.01)
(Continued)

(52) U.S. Cl.
CPC .... *G02F 1/133345* (2013.01); *G02F 1/13439* (2013.01); *G02F 1/133553* (2013.01);
(Continued)

(58) Field of Classification Search
CPC ......... G02F 1/133345; G02F 1/133734; G02F 1/133553; G02F 1/13439; G02F 1/137; G02F 2001/133742; G02F 2001/13685; G02F 1/1368; G02F 2203/02; G02F 2001/13712; G02F 2201/42; G02F 1/1337; G02F 1/13378; G02F 1/133788; G02F 1/133707; G02F 1/133784; G02F 1/133753; G02F 1/37; G02F 1/75; G02F 1/133719;
(Continued)

(56) References Cited

U.S. PATENT DOCUMENTS

| 6,344,888 B2 | 2/2002 | Yasukawa |
| 2001/0046011 A1 | 11/2001 | Yasukawa |

(Continued)

FOREIGN PATENT DOCUMENTS

| JP | 2004-4885 A | 1/2004 |
| JP | 2005-156717 A | 6/2005 |

(Continued)

*Primary Examiner* — Shan Liu
(74) *Attorney, Agent, or Firm* — Oliff PLC

(57) ABSTRACT

A liquid crystal device includes a first substrate in which a pixel electrode having reflectivity, an insulating film, and an orientation film including an oblique angle vapor deposition film are laminated in this order, and a second substrate in which a common electrode having light transmissivity and an orientation film are laminated in this order. A center wavelength λ (nm) of light source light incident from the second substrate side, a refractive index n of the insulating film, a penetration depth δ (nm) of the light source light into the pixel electrode, and a film thickness d (nm) from the pixel electrode to the center in a thickness of the orientation film satisfy the following conditional expression where m is a positive integer.

$$((m\lambda/2-\lambda/8)/n)-\delta < d < ((m\lambda/2+\lambda/8)/n)-\delta$$

7 Claims, 9 Drawing Sheets

(51) Int. Cl.
  *G02F 1/1335* (2006.01)
  *G02F 1/1337* (2006.01)
  *G03B 21/00* (2006.01)
  *G03B 33/12* (2006.01)
  *G02F 1/137* (2006.01)
  *G02F 1/1368* (2006.01)

(52) U.S. Cl.
  CPC ..... *G02F 1/133734* (2013.01); *G03B 21/006* (2013.01); *G03B 33/12* (2013.01); *G02F 1/137* (2013.01); *G02F 1/1368* (2013.01); *G02F 2001/13685* (2013.01); *G02F 2001/13712* (2013.01); *G02F 2001/133742* (2013.01); *G02F 2203/02* (2013.01)

(58) Field of Classification Search
  CPC ............... G02F 1/0027; G02F 1/141; G02F 2001/133738; G02F 2001/133769; G02F 2001/133776; G02F 2001/13787; G02F 2001/133746; G02F 2001/133749; G02F 2001/133773; G02F 2001/3548; G02F 2001/133761; G03B 33/12; G03B 21/006; G03B 21/132; H04N 9/3102; H04N 9/3105; G01N 27/205; G09G 3/367; G09G 2300/0495; G09G 2300/0486; H01L 21/02107; H01L 21/31; H01L 21/469; H01L 27/224; H01L 27/2418; H01L 21/02211; H05K 3/389; C08F 259/08; C09K 2019/548

USPC ............................... 349/5–10, 138, 123–136
See application file for complete search history.

(56) References Cited

U.S. PATENT DOCUMENTS

| | | | |
|---|---|---|---|
| 2005/0162591 A1* | 7/2005 | Hashimoto | G02F 1/133502 349/113 |
| 2008/0259286 A1* | 10/2008 | Suzuki | G03B 33/12 353/31 |
| 2012/0307166 A1 | 12/2012 | Terao | |
| 2013/0050624 A1* | 2/2013 | Kim | G02F 1/133711 349/123 |
| 2013/0258263 A1* | 10/2013 | Yasukawa | G02F 1/134309 349/138 |
| 2015/0194633 A1* | 7/2015 | Lee | C07D 487/14 257/40 |
| 2016/0026044 A1* | 1/2016 | Nam | G02F 1/133723 349/42 |

FOREIGN PATENT DOCUMENTS

| | | |
|---|---|---|
| JP | 2005-189867 A | 7/2005 |
| JP | 2008-268581 A | 11/2008 |
| JP | 2009-31545 A | 2/2009 |
| JP | 2011-164330 A | 8/2011 |
| JP | 2013-15815 A | 1/2013 |

\* cited by examiner

DISPLAY DEVICE AND LIQUID CRYSTAL DEVICE

BACKGROUND

1. Technical Field

The invention relates to a display device including a liquid crystal device of a reflection type and to a liquid crystal device.

2. Related Art

A projection-type display device including a reflection-type liquid crystal device includes a plurality of liquid crystal devices each including a first substrate including a reflective first electrode and a first orientation film, a second substrate including a transmissive second electrode and a second orientation film on a side facing the first electrode, and a liquid crystal layer provided between the first substrate and the second substrate, and light source light of each wavelength region emitted from a light source unit is modulated in each of the plurality of liquid crystal devices.

On the other hand, technology in which a passivation film such as a silicon nitride film is provided to cover a reflective first electrode and thus, to protect the first substrate is conceivable (see, JP-A-2005-189867).

In a projection-type display device including a liquid crystal device, the liquid crystal device is irradiated with light source light having high intensity. On the other hand, in the reflection-type liquid crystal device used in the projection-type display device, when a first orientation film overlapping the reflective first electrode includes an oblique angle vapor deposition film, a liquid crystal material used for the liquid crystal layer tends to easily degrade. However, a cause of the degradation has not been discussed sufficiently.

Here, as a result of investigation of the cause of the degradation, the inventors have obtained the following finding. Firstly, in the reflection-type liquid crystal device, when a standing wave is generated by light source light incident on the first electrode from the second substrate side and by reflected light reflected at the first electrode, power density is high at a position corresponding to an antinode of the standing wave. Accordingly, in a case where the antinode of the standing wave is positioned at an interface between the liquid crystal layer and the first orientation film, the liquid crystal material used for the liquid crystal layer easily degrades due to photoreaction at the interface between the liquid crystal layer and the first orientation film. Therefore, when the antinode of the standing wave is offset from the interface between the liquid crystal layer and the first orientation film, the photoreaction in the liquid crystal layer at the interface between the liquid crystal layer and the first orientation film can be suppressed, and a light resistance life of the liquid crystal device can be extended. However, when the first orientation film includes the oblique angle vapor deposition film, the first orientation film (oblique angle vapor deposition film) includes a porous structure including a plurality of columns obliquely inclined and thus, the interface between the liquid crystal layer and the first orientation film exists entirely or substantially entirely in a thickness direction of the first orientation film. Thus, the range where the power density of the standing wave is high (a section around the antinode) is positioned in the range where the interface between the liquid crystal layer and the first orientation film exists. Therefore, when the first orientation film includes the oblique angle vapor deposition film, the liquid crystal material used for the liquid crystal layer easily degrades due to photoreaction.

It is difficult to suppress occurrence of such an issue only by forming the passivation film between the first electrode and the first orientation film, as in the technology described in JP-A-2005-189867.

SUMMARY

An advantage of some aspects of the invention is to provide a display device capable of improving a light resistance life of a liquid crystal device including an orientation film formed of an oblique angle vapor deposition film, and to provide the liquid crystal device.

To address the above-described issue, a display device according to an aspect of the invention includes a light source unit configured to emit light source light, a plurality of liquid crystal devices of a reflection type each configured to receive the light source light of a different wavelength region, and an optical system configured to compose and project modulated light emitted from the plurality of liquid crystal devices, wherein one of the plurality of liquid crystal devices includes a first substrate in which a first electrode having reflectivity, a first insulating film, and a first orientation film including an oblique angle vapor deposition film are laminated in this order, a second substrate in which a second electrode having light transmissivity and a second orientation film are laminated in this order on a side facing the first electrode, and a liquid crystal layer provided between the first substrate and the second substrate, and a wavelength $\lambda$, a refractive index n, a penetration depth $\delta$, and a film thickness d satisfy a conditional expression where $\lambda$ (nm) represents a center wavelength of the light source light incident from the second substrate side, n represents a refractive index of the first insulating film, $\delta$ (nm) represents a penetration depth of the light source light into a surface of the first electrode when the light source light is reflected at the first electrode, d (nm) represents a film thickness from the surface of the first electrode to the center in a thickness of the first orientation film, and m is a positive integer.

$$\frac{\frac{m\lambda}{2} - \frac{\lambda}{8}}{n} - \delta < d < \frac{\frac{m\lambda}{2} + \frac{\lambda}{8}}{n} - \delta \qquad \text{[Expression 1]}$$

in the above expression,
m is a positive integer of 1 or more, $$\delta = \sqrt{\frac{2\rho}{\mu\omega}}$$

$\rho$ represents a reflectance,
$\mu$ represents an absolute permeability (H/m),
$\omega$ represents an angular frequency (rad/s) of an optical electric field defined by the following expression, $$\omega = \frac{2\pi c}{\lambda}$$

c represents speed of light in vacuum (m/s).

In the display device according to the aspect of the invention satisfying the above-described conditional expression, even when an interface between the liquid crystal layer and the first orientation film exists entirely or substantially entirely in a thickness direction of the first orientation film, a section where power density of a standing wave is low (a section around a node) is positioned around the center in the thickness direction of the first orientation film, and a section where power density of the standing wave is high (a section around an antinode) is not positioned around the center in the thickness direction of the first orientation film. Thus, degradation of a liquid crystal material due to photoreaction at the interface between the first orientation film and the liquid crystal layer can be suppressed. Therefore, a light resistance life of the liquid crystal device can be improved.

According to an aspect of the invention, the first insulating film can include a single layer of insulating film.

According to an aspect of the invention, the m in the conditional expression can be 1. When the m is a minimum value (1), the first insulating film is thin, and thus, an electrical field can be applied appropriately to the liquid crystal layer.

According to an aspect of the invention, the first insulating film can be a laminated film including a plurality of insulating films, and the refractive index n of the first insulating film can be a refractive index of an insulating film having the largest film thickness of the plurality of insulating films, an arithmetic mean of respective refractive indices of the plurality of insulating films, or a weighted mean value obtained by weighting the respective refractive indices of the plurality of insulating films with respective thicknesses of the plurality of insulating films.

According to an aspect of the invention, the plurality of insulating films can include a plurality of insulating films constituting a reflection enhancing film. According to such a configuration, a reflectance at the first electrode can be increased and thus, a bright image can be displayed.

According to an aspect of the invention, the m in the conditional expression can be 2. In a case where the first insulating film is the laminated film including the plurality of insulating films, the m cannot be set to 1, but even in such a case, when the m is set to a minimum value (2) in the possible range, the first insulating film is thin, and thus, an electrical field can be applied appropriately to the liquid crystal layer.

According to an aspect of the invention, the light source unit can include a light source which is a single wavelength light source or a substantially single wavelength light source.

According to an aspect of the invention, the light source unit can include a light source other than a single wavelength light source or other than a substantially single wavelength light source, and the m in the conditional expression can be 2.

According to an aspect of the invention, a film thickness of the first orientation film can be less than $\lambda/(4n)$. According to such an aspect, in the thickness direction of the first orientation film, positioning of the antinode of the standing wave at the center in the thickness direction and also at a position offset from the center in the thickness direction can be avoided.

According to an aspect of the invention, the first insulating film can include an orientation film including a vertical orientation film. According to such an aspect, the first orientation film including the oblique angle vapor deposition film can be thinner and thus, reliability can be improved.

According to an aspect of the invention, among the plurality of liquid crystal devices, at least a liquid crystal device configured to receive the light source light of the lowest wavelength region can satisfy the conditional expression. According to such an aspect, a light resistance life of the liquid crystal device including the liquid crystal material easy to degrade can be improved.

According to an aspect of the invention, the plurality of liquid crystal devices each may satisfy the conditional expression.

According to an aspect of the invention, the second substrate can include the second electrode, a second insulating film, and the second orientation film laminated in this order, the second insulating film can include the same configuration as a configuration of the first insulating film, and the second orientation film can include the same configuration as a configuration of the first orientation film.

A liquid crystal device according to another aspect of the invention includes a first substrate in which a first electrode having reflectivity, a first insulating film, and a first orientation film including an oblique angle vapor deposition film are laminated in this order, a second substrate in which a second electrode having light transmissivity and a second orientation film are laminated in this order on a side facing the first electrode, and a liquid crystal layer provided between the first substrate and the second substrate, wherein a wavelength $\lambda$, a refractive index n, a penetration depth $\delta$, and a film thickness d satisfy a conditional expression where $\lambda$ (nm) represents a center wavelength of the light source light incident from the second substrate side, n represents a refractive index of the first insulating film, $\delta$ (nm) represents a penetration depth of the light source light into a surface of the first electrode when the light source light is reflected at the first electrode, d (nm) represents a film thickness from the surface of the first electrode to the center in a thickness of the first orientation film, and m is a positive integer.

$$\frac{\frac{m\lambda}{2}-\frac{\lambda}{8}}{n}-\delta < d < \frac{\frac{m\lambda}{2}+\frac{\lambda}{8}}{n}-\delta \quad \text{[Expression 2]}$$

in the above expression,
m is a positive integer of 1 or more, $$\delta = \sqrt{\frac{2\rho}{\mu\omega}}$$

$\rho$ represents a reflectance,
$\mu$ represents an absolute permeability (H/m),
$\omega$ represents an angular frequency (rad/s) of an optical electric field defined by the following expression, $$\omega = \frac{2\pi c}{\lambda}$$

c represents speed of light in vacuum (m/s).

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
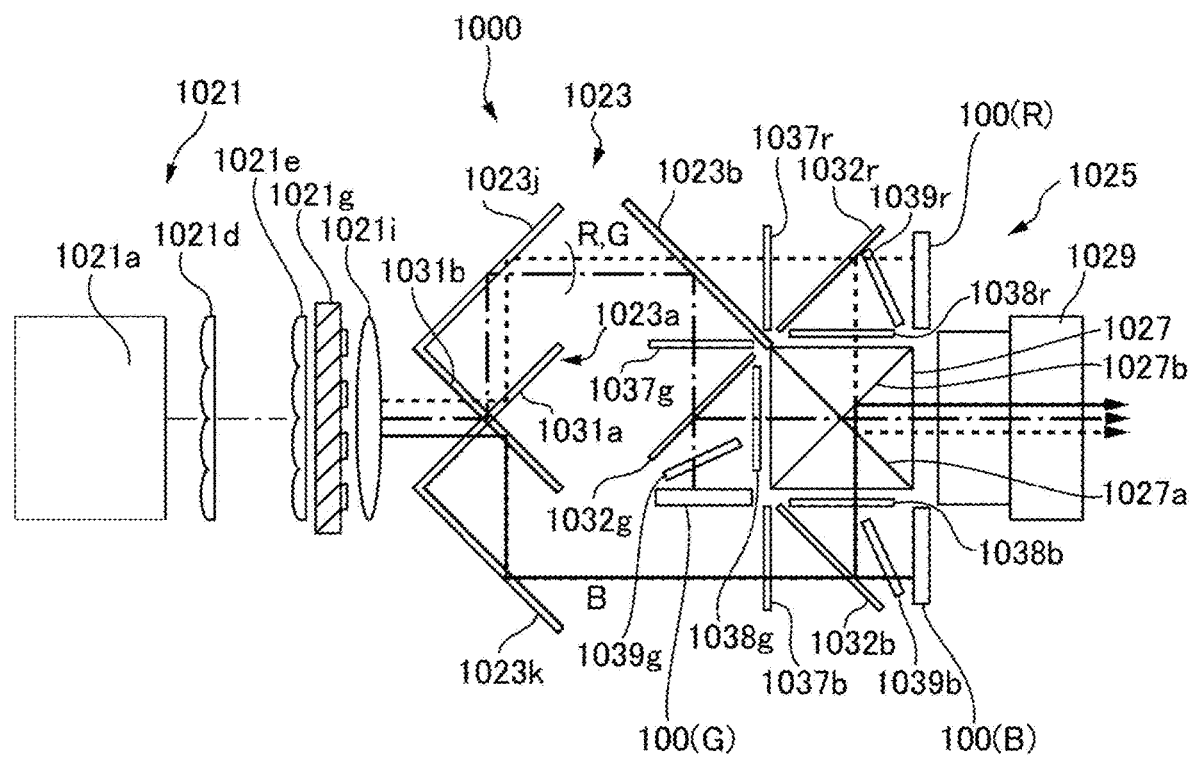
FIG. 1 is a schematic configuration view illustrating an example of a display device according to the invention.

Exemplary embodiments of the invention will be described with reference to the drawings. Note that in the drawings referred to in the description below, to illustrate each layer or each member at a recognizable size, each layer or each member is illustrated in a different scale. Furthermore, when a layer formed in a first substrate is described, an upper layer side or a surface side means a side opposite to a side on which a substrate main body of the first substrate is positioned (side on which a counter substrate and a liquid crystal layer are positioned), and a lower layer side means a side on which the substrate main body of the first substrate is positioned. When a layer formed in a second substrate is described, an upper layer side or a surface side means a side opposite to a side on which a substrate main body of a counter substrate is positioned (side on which the first substrate and the liquid crystal layer are positioned), and a lower layer side means a side on which a substrate main body of the second substrate is positioned.

Hereinafter, a case where a pixel electrode 9a having reflectivity is formed in a first substrate 10 and a common electrode 21 having light transmissivity is formed in a second substrate 20 is mainly described as a liquid crystal device 100 according to an exemplary embodiment of the invention. In such a liquid crystal device 100, the pixel electrode 9a formed in the first substrate 10 corresponds to a "first electrode" in the invention, an orientation film 16 formed in the first substrate 10 corresponds to a "first orientation film" in the invention, and an insulating film 15 formed between the pixel electrode 9a (first electrode) and the orientation film 16 in the first substrate 10 corresponds to a "first insulating film". Furthermore, the common electrode 21 having light transmissivity and formed in the second substrate 20 corresponds to a "second electrode" in the invention, an orientation film 26 formed in the second substrate 20 corresponds to a "second orientation film" in the invention, and an insulating film formed between the common electrode 21 (second electrode) and the orientation film 26 in the second substrate 20 corresponds to a "second insulating film".

Exemplary Embodiment 1

Configuration of Display Device

FIG. 1 is a schematic configuration view illustrating an example of a display device according to the invention. The display device illustrated in FIG. 1 is a projection-type display device using a reflection-type liquid crystal device as a light bulb. A projection-type display device 1000 illustrated in FIG. 1 includes a light source unit 1021 configured to generate light source light, a color-separating and light-guiding optical system 1023 configured to separate the light source light emitted from the light source unit 1021 into three colors of red, green, and blue, and a light-modulating portion 1025 configured to be illuminated by the light source light of each color emitted from the color-separating and light-guiding optical system 1023. The light-modulating portion 1025 includes a liquid crystal device 100. Furthermore, the projection-type display device 1000 includes a cross dichroic prism 1027 (composition optical system, optical system) configured to compose image light of each color emitted from the light-modulating portion 1025, and a projection optical system 1029 (optical system) configured to project the image light traveling through the cross dichroic prism 1027 onto a screen (not illustrated).

In such a projection-type display device 1000, the light source unit 1021 includes a light source 1021a, a pair of fly-eye optical systems 1021d and 1021e, a polarization conversion member 1021g, and a superposing lens 1021i. The light source unit 1021 includes, as the light source 1021a, a light source other than a single wavelength light source or other than a substantially single wavelength light source, such as an extra-high pressure mercury lamp. Furthermore, the light source unit 1021 may include, as the light source 1021a, a solid light source which is a single wavelength light source or a substantially single wavelength light source, such as a laser diode.

The fly-eye optical systems 1021d and 1021e each include a plurality of element lenses arranged in a matrix shape in a plane orthogonal to a system optical axis. The light source light is divided by these element lenses, and is condensed or diverged separately. The polarization conversion member 1021g converts the light source light emitted from the fly-eye optical system 1021e into light including, for example, only a p-polarized light component parallel to the figure, and supplies the converted light to an optical system on a downstream side of an optical path. The superposing lens 1021i appropriately converges as a whole the light source light traveling through the polarization conversion member 1021g and thus, superimposed illumination can be performed in a uniform manner on each of a plurality of liquid crystal devices 100 (R), (G), and (B) provided in the light-modulating portion 1025.

The color-separating and light-guiding optical system 1023 includes a cross dichroic mirror 1023a, a dichroic mirror 1023b, and reflection mirrors 1023j and 1023k. In the color-separating and light-guiding optical system 1023, light source light of substantially white from the light source unit 1021 is incident on the cross dichroic mirror 1023a. Light of red (R) reflected at a first dichroic mirror 1031a constituting the cross dichroic mirror 1023a is reflected at the reflection mirror 1023j, and transmits the dichroic mirror 1023b to travel through an incident side polarization plate 1037r, a wire grid polarization plate 1032r configured to transmit p-polarized light and reflect s-polarized light, and an optical compensation plate 1039r to be incident as the p-polarized light on the liquid crystal device 100 for red (R).

Furthermore, light of green (G) reflected at the first dichroic mirror 1031a is reflected at the reflection mirror 1023j, and subsequently also reflected at the dichroic mirror 1023b to travel through an incident side polarization plate 1037g, a wire grid polarization plate 1032g configured to transmit p-polarized light and reflect s-polarized light, and an optical compensation plate 1039g to be incident as the p-polarized light on the liquid crystal device 100 for green (G).

In contrast, light of blue (B) reflected at another second dichroic mirror 1031b constituting the cross dichroic mirror 1023a is reflected at the reflection mirror 1023k to travel through an incident side polarization plate 1037b, a wire grid polarization plate 1032b configured to transmit p-polarized light and reflect s-polarized light, and an optical compensation plate 1039b to be incident as the p-polarized light on the liquid crystal device 100 for blue (B). Note that the optical compensation plates 1039r, 1039g, and 1039b adjust polarization states of light incident on and emitted from the liquid crystal device 100, and thus optically compensates properties of a liquid crystal layer.

In the projection-type display device 1000 configured in this way, the incident light of each of the three colors traveling through the optical compensation plate 1039r, 1039g, or 1039b is modulated in each liquid crystal device 100. In the modulation, component light of s-polarized light of the modulated light emitted from the liquid crystal device 100 (R), (G), or (B) is reflected at the wire grid polarization plate 1032r, 1032g, or 1032b, and travels through an emission side polarization plate 1038r, 1038g, or 1038b to be incident on the cross dichroic prism 1027. In the cross dichroic prism 1027 (composition optical system, optical system), a first dielectric multilayer film 1027a and a second dielectric multilayer film 1027b intersecting each other in an X-shape are formed, and the first dielectric multilayer film 1027a reflects the R-light, and the second dielectric multilayer film 1027b reflects the B-light. Accordingly, the light of the three colors is composed in the cross dichroic prism 1027, and is emitted to the projection optical system 1029 (optical system). Then, the projection optical system 1029 projects color image light composed in the cross dichroic prism 1027 onto a screen (not illustrated) at a desired magnification.

Specific Configuration of Liquid Crystal Device 100

Figure 2:
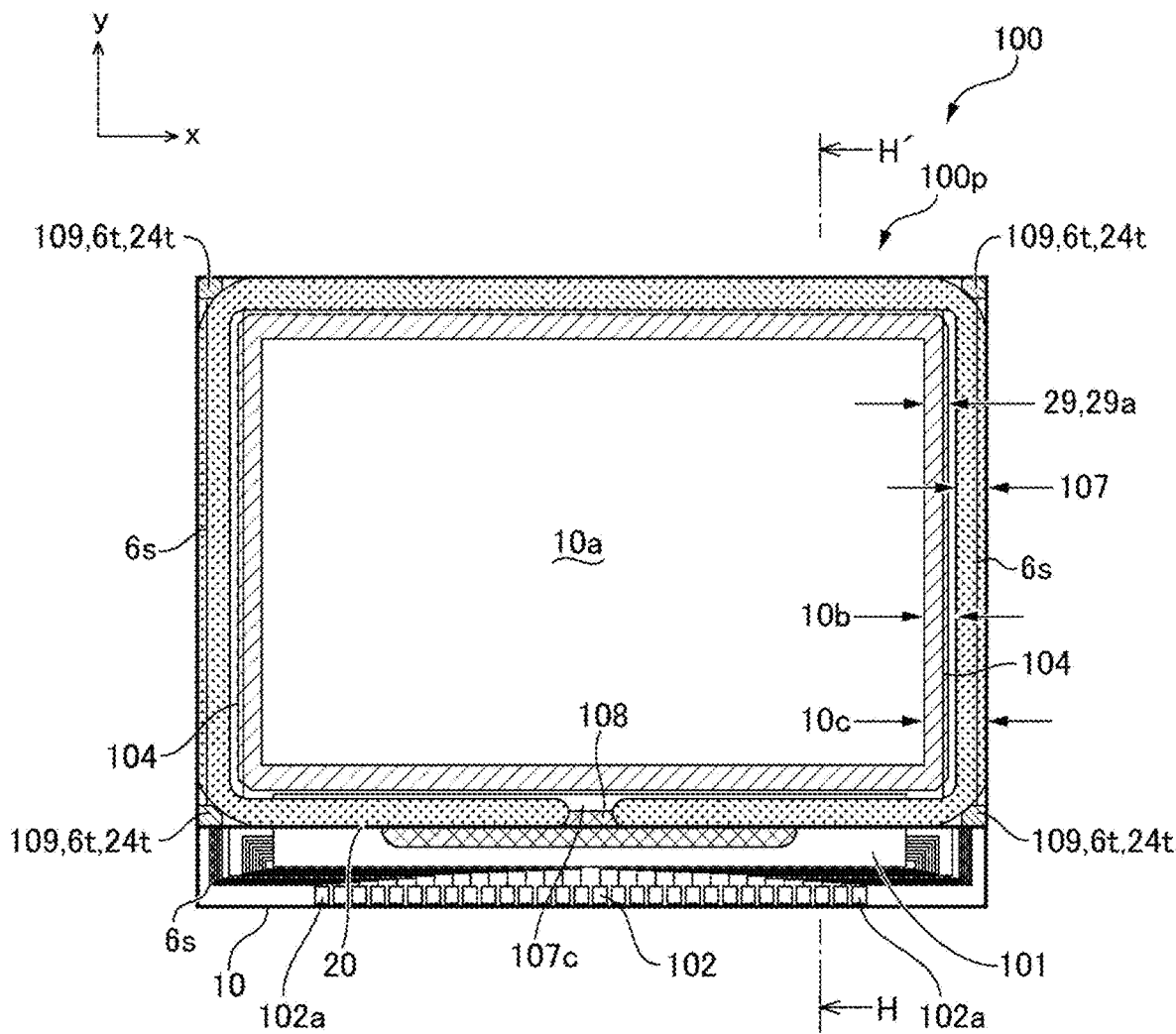
FIG. 2 is a plan view illustrating a specific configuration example of a liquid crystal device according to Exemplary Embodiment 1 of the invention.
Figure 3:
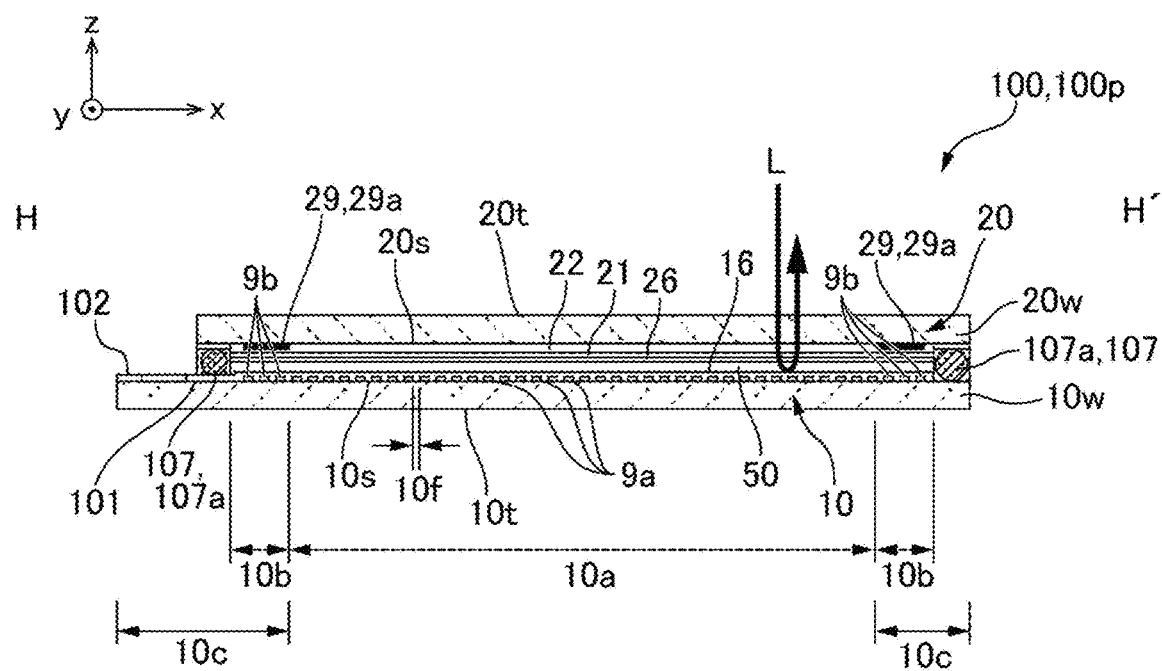
FIG. 3 is an H-H' cross-sectional view of the liquid crystal device illustrated in FIG. 2.

FIG. 2 is a plan view illustrating a specific configuration example of the liquid crystal device 100 according to Exemplary Embodiment 1 of the invention. FIG. 3 is an H-H' cross-sectional view of the liquid crystal device 100 illustrated in FIG. 2. Note that in FIG. 2, FIG. 3, and the like, two directions (a first direction and a second direction) intersecting each other in an in-plane direction of the liquid crystal device 100 are defined as an x direction and a y direction, and a third direction (a thickness direction of the liquid crystal device 100) intersecting the x direction and the y direction is defined as a z direction.

The liquid crystal device 100 illustrated in FIG. 2 and FIG. 3 includes a liquid crystal panel 100p of an active matrix type. In the liquid crystal device 100, a first substrate 10 (element substrate) and a second substrate 20 (counter substrate) are bonded together by a seal material 107 via a predetermined gap between the first substrate 10 and the second substrate 20, and the seal material 107 is provided in a frame shape along an outer periphery of the second substrate 20. The seal material 107 is an adhesive including a photocurable resin, a thermosetting resin and the like, and the seal material 107 includes a gap material 107a such as glass fiber or glass beads compounded to set a distance between the first substrate 10 and the second substrate 20 to a predetermined value. In the liquid crystal panel 100p, a liquid crystal layer 50 is provided in a region surrounded by the seal material 107 and located between the first substrate 10 and the second substrate 20. In the seal material 107, a cut portion 107c used as a liquid crystal injection port is formed, and such a cut portion 107c is sealed by a sealing material 108 after a liquid crystal material is injected. Note that in a case where the liquid crystal material is injected and sealed by using a dropping method, the cut portion 107c is not formed.

In the liquid crystal panel 100p, the first substrate 10 and the second substrate 20 each have a quadrangular shape, and in a substantially central portion of the liquid crystal panel 100p, a display region 10a is provided as a quadrangular region. In accordance with such a shape, the seal material 107 is also provided in a substantially quadrangular shape, and an outer peripheral region 10c having a quadrangular frame shape is provided outside the display region 10a.

On a side on which the first substrate 10 protrudes from the second substrate 20 at the outer peripheral region 10c (frame-shaped region located on an outer peripheral side of the display region 10a) in the first substrate 10, a data line driving circuit 101 and a plurality of terminals 102 are formed along one side of the first substrate 10, and a scanning line driving circuit 104 is formed along each of other sides adjacent to the one side of the first substrate 10. The terminals 102 are provided on an outer peripheral side of the seal material 107. A flexible wiring substrate (not illustrated) is coupled to the terminals 102, and a variety of potentials and signals are input to the first substrate 10 via the flexible wiring substrate.

The first substrate 10 includes a substrate main body 10w having light transmissivity such as a quartz substrate and a glass substrate. The first substrate 10 (substrate main body 10w) includes a first surface 10s and a second surface 10t, and on a side of the first surface 10s facing the second substrate 20, a plurality of pixel switching elements, and pixel electrodes 9a (first electrodes) electrically coupled to the plurality of pixel switching elements, respectively are formed in a matrix shape in the display region 10a. An orientation film 16 (first orientation film) is formed on the upper layer side of the pixel electrodes 9a. Furthermore, on a side of the first surface 10s of the first substrate 10, dummy pixel electrodes 9b formed simultaneously with the pixel electrodes 9a are formed in a surrounding region 10b having a quadrangular frame shape and sandwiched between the display region 10a and the seal material 107 in the outer peripheral region 10c located outside of the display region 10a.

The second substrate 20 includes a substrate main body 20w having light transmissivity such as a quartz substrate and a glass substrate. The second substrate 20 (substrate main body 20w) includes a first surface 20s and a second surface 20t, and a common electrode 21 (second electrode) is formed on a side of the first surface 20s facing the first substrate 10. The common electrode 21 is formed substantially entirely on a surface of the second substrate 20, or is formed as a plurality of strip electrodes extending across a plurality of pixels. In the exemplary embodiment, the common electrode 21 is formed substantially entirely on the surface of the second substrate 20.

On a side of the first surface 20s of the second substrate 20, a light shielding layer 29 is formed on the lower layer side of the common electrode 21, and an orientation film 26 (second orientation film) is laminated on a face located on the liquid crystal layer 50 side of the common electrode 21. Furthermore, a flattening film 22 having light transmissivity is formed between the light shielding layer 29 and the common electrode 21. The light shielding layer 29 is formed as a frame portion 29a extending along an outer peripheral edge of the display region 10a. The light shielding layer 29 may be formed to include a black matrix portion (not illustrated) overlapping with inter-pixel regions 10f each sandwiched between the pixel electrodes 9a adjacent to each other. The frame portion 29a is formed at a position where the frame portion 29a planarly overlaps with the dummy pixel electrodes 9b.

The orientation film 16 and the orientation film 26 are each an inorganic orientation film including an oblique angle vapor deposition film of $SiO_x$ (x≥2), $TiO_2$, MgO, $Al_2O_3$ and the like, and each includes a columnar structural body layer in which columnar bodies referred to as columns are inclined obliquely with respect to any of the first substrate 10 and the second substrate 20. Accordingly, the orientation film 16 and the orientation film 26 cause nematic liquid crystal molecules having negative dielectric anisotropy and used in the liquid crystal layer 50 to be oriented in an obliquely inclined manner with respect to the first substrate 10 and the second substrate 20, and give a pre-tilt to the liquid crystal molecules. In this way, the liquid crystal device 100 is configured as a liquid crystal device of a normally black vertical alignment (VA) mode.

In the liquid crystal panel 100p, outside of the seal material 107, inter-substrate conduction electrode portions 24t are formed at four corner sections on the side of the first surface 20s of the second substrate 20, and on the side of the first surface 10s of the first substrate 10, inter-substrate conduction electrode portions 6t are formed at positions facing the four corner sections (inter-substrate conduction electrode portions 24t) of the second substrate 20. The inter-substrate conduction electrode portions 6t are conductively connected to a fixed potential wiring line 6s to which a common potential Vcom is applied, and the fixed potential wiring line 6s is conductively connected to common potential application terminals 102a of the terminals 102. Inter-substrate conduction materials 109 including conductive particles are disposed between the inter-substrate conduction electrode portions 6t and the inter-substrate conduction electrode portions 24t, and the common electrode 21 of the second substrate 20 is electrically coupled to the first substrate 10 side via the inter-substrate conduction electrode portions 6t, the inter-substrate conduction materials 109, and the inter-substrate conduction electrode portions 24t. Thus, the common potential Vcom is applied to the common electrode 21 from the side of the first substrate 10.

The liquid crystal device 100 of the exemplary embodiment is a reflection-type liquid crystal device. Accordingly, the pixel electrodes 9a are each a reflective electrode including a reflective metal film such as an aluminum film. The common electrode 21 is a transmissive electrode including a transmissive conductive film such as an Indium Tin Oxide (ITO) film and an Indium Zinc Oxide (IZO) film. In such a liquid crystal device 100 of a reflection type, while light source light L incident from a side of the second substrate 20 is reflected on the side of the first substrate 10 and is emitted from the second substrate 20, the light source light L is modulated and an image is displayed.

The liquid crystal device 100 can be used as a light bulb for RGB in the projection-type display device 1000 illustrated in FIG. 1. In this case, for example, light of each color decomposed through the dichroic mirror for RGB color decomposition is incident as projection light on each of the liquid crystal devices 100 for RGB and thus, a color filter is not formed.

Specific Configuration of Pixel

Figure 4:
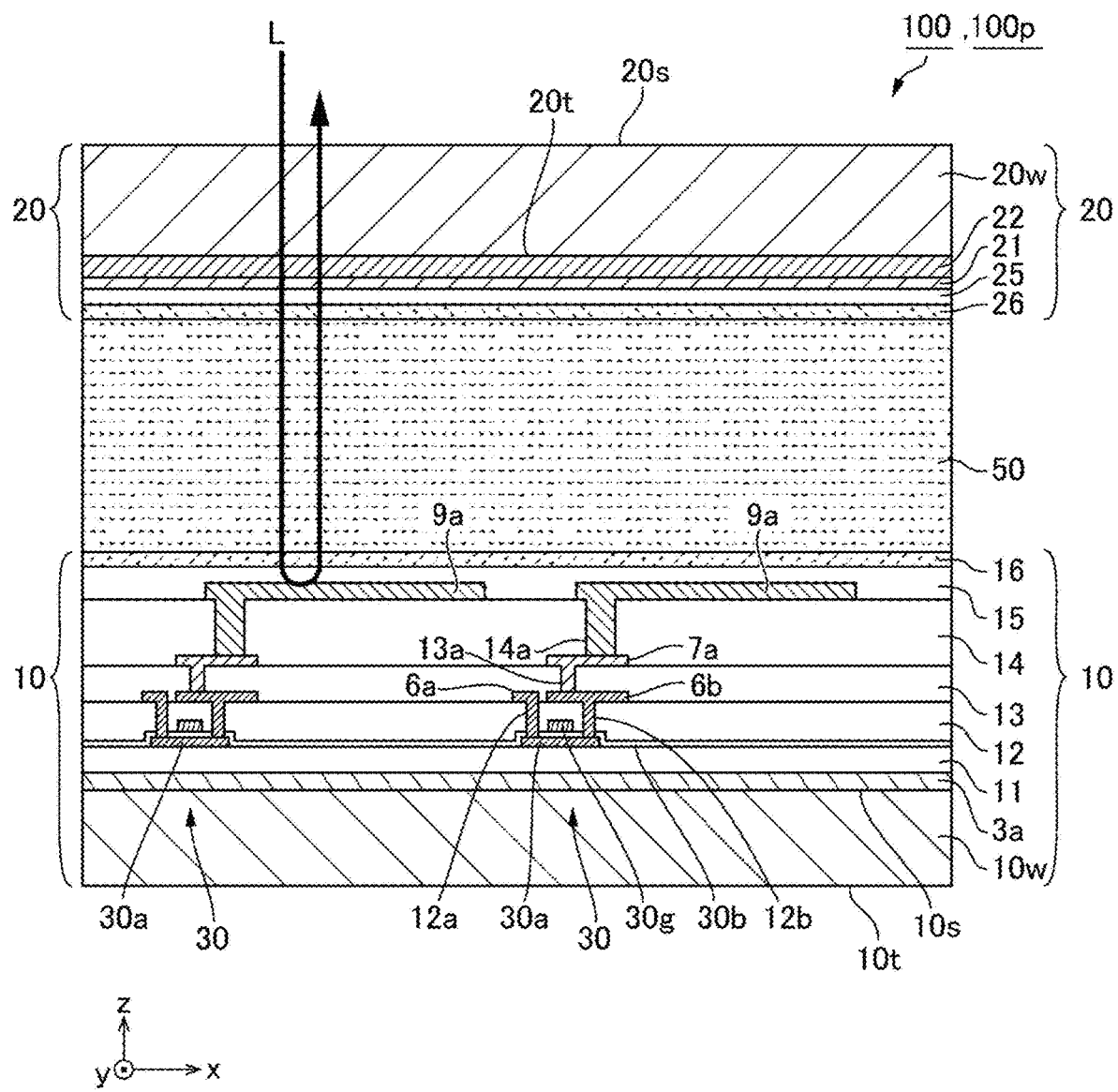
FIG. 4 is a cross-sectional view schematically illustrating a specific configuration example of pixels of the liquid crystal device illustrated in FIG. 2.

FIG. 4 is a cross-sectional view schematically illustrating a specific configuration example of pixels of the liquid crystal device 100 illustrated in FIG. 2. As illustrated in FIG. 4, a scanning line 3a located on the lower layer side and including a conductive film such as a conductive polysilicon film, a metal silicide film, a metal film, or a metal compound film is formed on the first surface 10s side of the first substrate 10. In the exemplary embodiment, the scanning line 3a includes a light shielding film of tungsten silicide (WSi) or the like. An insulating film 11 having light transmissivity is formed on the upper layer side of the scanning line 3a, and the pixel switching element 30 including a semiconductor layer 30a is formed on the surface side of such an insulating film 11. In the exemplary embodiment, the insulating film 11 includes a silicon oxide film or the like.

The pixel switching element 30 includes the semiconductor layer 30a, and a gate electrode 30g intersecting the semiconductor layer 30a, and includes a gate insulating film 30b having light transmissivity between the semiconductor layer 30a and the gate electrode 30g. The semiconductor layer 30a includes a polysilicon film (polycrystalline silicon film) or the like. The gate insulating film 30b includes a two-layer structure including a gate insulating film including a silicon oxide film obtained by thermally oxidizing the semiconductor layer 30a, and a second gate insulating film including a silicon oxide film formed by a low pressure CVD method or the like. The gate electrode 30g is electrically coupled via a contact hole (not illustrated) passing through the gate insulating film 30b and the insulating film 11.

Interlayer insulating films 12, 13, and 14 having light transmissivity and each including a silicon oxide film or the like are formed in this order on the upper layer side of the gate electrode 30g, and holding capacitor (not illustrated) is constituted by utilizing spaces among the interlayer insulating films 12, 13, and 14, and the like. A data line 6a and a drain electrode 6b are formed between the interlayer insulating film 12 and the interlayer insulating film 13, and a relay electrode 7a is formed between the interlayer insulating film 13 and the interlayer insulating film 14. The data line 6a is electrically coupled to a source region of the semiconductor layer 30a via a contact hole 12a passing through the interlayer insulating film 12 and the gate insulating film 30b. The drain electrode 6b is electrically coupled to a drain region of the semiconductor layer 30a via a contact hole 12b passing through the interlayer insulating film 12 and the gate insulating film 30b. The relay electrode 7a is electrically coupled to the drain electrode 6b via a contact hole 13a passing through the interlayer insulating film 13. A surface of the interlayer insulating film 14 is a flat face, and each pixel electrode 9a is formed on the surface side of the interlayer insulating film 14 (face side on a side of the liquid crystal layer 50). The pixel electrode 9a is conductively connected to the relay electrode 7a via a contact hole 14a passing through the interlayer insulating film 14. Accordingly, the pixel electrode 9a is electrically coupled to a drain region of the pixel switching element 30 via the relay electrode 7a and the drain electrode 6b.

In the first substrate 10, for reasons described below, an insulating film 15 (first insulating film) is formed between the pixel electrode 9a and the orientation film 16. As for the insulating film 15, to control a film thickness of a portion overlapping with the pixel electrode 9a, the insulating film 15 is formed and subsequently, a surface of the insulating film 15 (face opposite to the pixel electrode 9a) is flattened.

Corresponding to such a configuration, in the second substrate 20, an insulating film 25 (second insulating film) is formed between the common electrode 21 and the orientation film 26. Here, the orientation film 16 and the orientation film 26 include the same configuration. More specifically, the orientation film 16 and the orientation film 26 are the same in a constituent material, a film thickness, and a film forming method. Furthermore, the insulating film 15 (first insulating film) and the insulating film 25 (second insulating film) include the same configuration. More specifically, the insulating film 15 and the insulating film 25 are the same in a constituent material, a film thickness, and a film forming method. Accordingly, in the liquid crystal device 100, a face of the first substrate 10 being in contact with the liquid crystal layer 50 has the same configuration as a configuration of a face of the second substrate 20 being in contact with the liquid crystal layer 50. Therefore, when the liquid crystal device 100 is driven inversely, accumulation of electric charges or the like is difficult to occur.

Configuration for Improving Light Resistance

Figure 5:
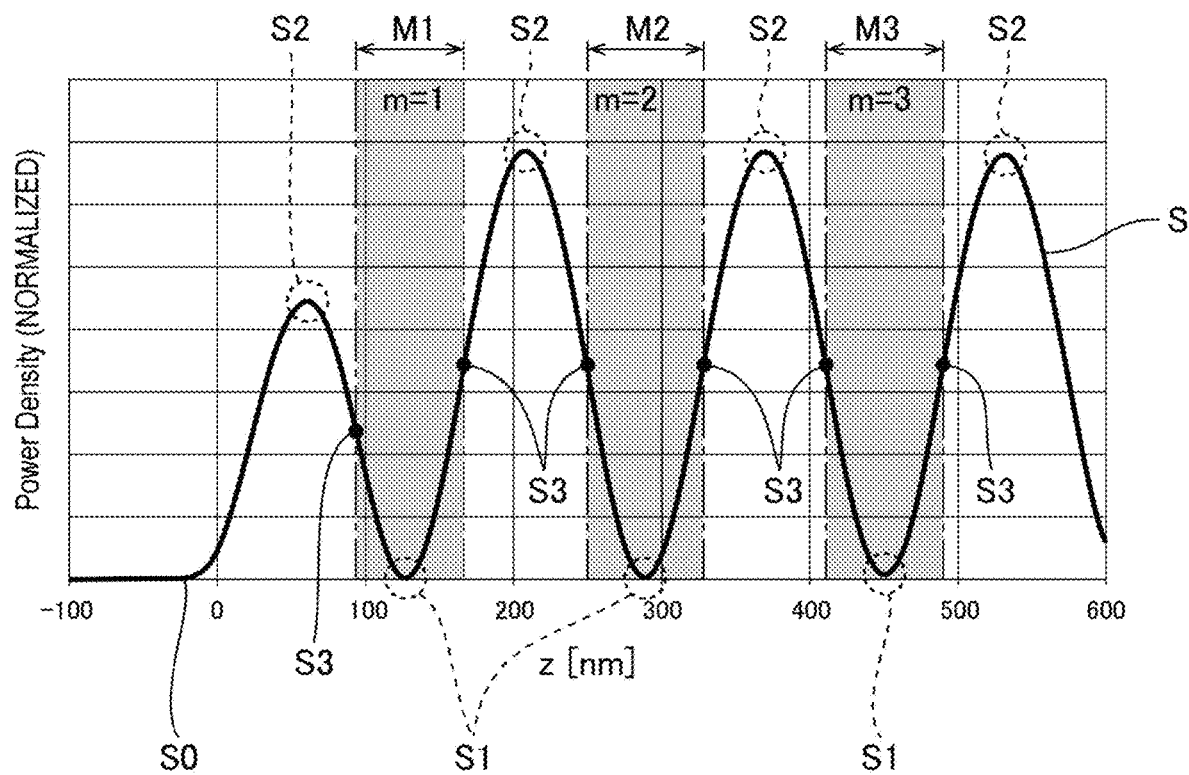
FIG. 5 is an explanatory view illustrating power density of a standing wave generated in proximity to a pixel electrode of a first substrate illustrated in FIG. 4.
Figure 6:
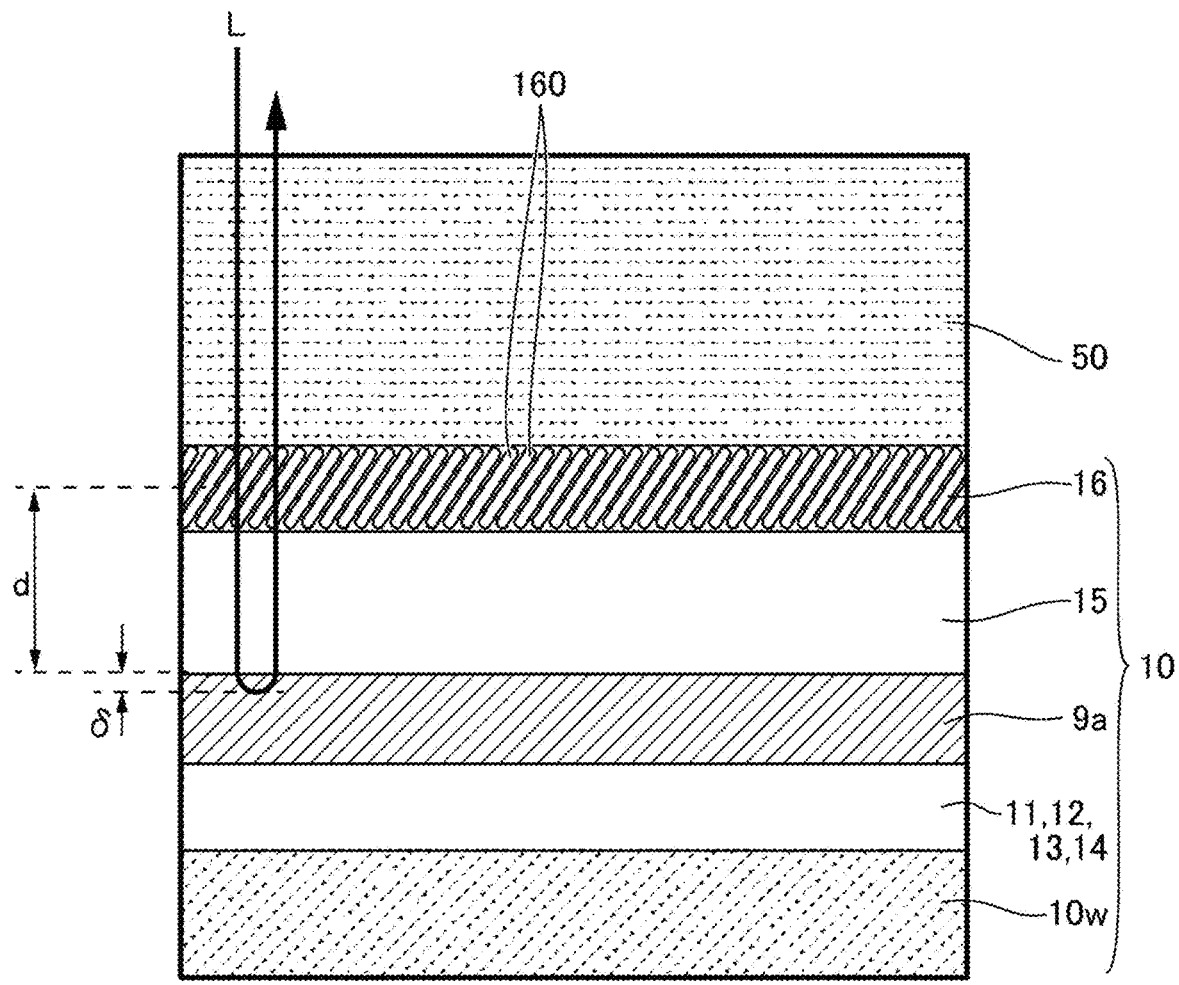
FIG. 6 is an explanatory view schematically illustrating a cross section of the first substrate illustrated in FIG. 4.

FIG. 5 is an explanatory view illustrating power density of a standing wave S generated in proximity to the pixel electrode 9a of the first substrate 10 illustrated in FIG. 4. FIG. 6 is an explanatory view schematically illustrating a cross section of the first substrate 10 illustrated in FIG. 4. In FIG. 5, a surface of the pixel electrode 9a is defined as a 0 nm position (a reference position) in the z direction.

As illustrated in FIG. 4, light incident on the pixel electrode 9a of the first substrate 10 from the side of the second substrate 20 is reflected at the pixel electrode 9a. Accordingly, in proximity to the surface of the pixel electrode 9a, the standing wave S illustrated in FIG. 5 is generated in a sinusoidal shape by the light source light incident on the pixel electrode 9a from the side of the second substrate 20 and the reflected light reflected at the pixel electrode 9a. A vertical axis in FIG. 5 represents a value obtained by calculating the power density of the standing wave S by a Finite-Difference Time-Domain method (FDTD method). As illustrated in FIG. 5, the power density becomes minimum in a section corresponding to a node S1 of the standing wave S, and the power density becomes maximum in a section corresponding to an antinode S2 of the standing wave S. Accordingly, in a case where the antinode S2 of the standing wave S is positioned at an interface between the orientation film 16 and the liquid crystal layer 50 illustrated in FIG. 4, photoreaction easily occurs in a material constituting the liquid crystal layer 50 (liquid crystal material). In contrast, in a case where the antinode S2 of the standing wave S is offset from the interface between the orientation film 16 and the liquid crystal layer 50, photoreaction is difficult to occur in the material constituting the liquid crystal layer 50 (liquid crystal material). Note that since the light incident on the pixel electrode 9a of the first substrate 10 penetrates by a predetermined depth from the surface of the pixel electrode 9a and is reflected, an end S0 of the standing wave S is positioned at a position by the predetermined depth from the surface of the pixel electrode 9a.

In this exemplary embodiment, the orientation film 16 is an inorganic orientation film including an oblique angle vapor deposition film of $SiO_x$ ($x \leq 2$). As schematically illustrated in FIG. 6, such an orientation film 16 includes a columnar structural body layer in which columnar bodies referred to as columns 160 are formed obliquely with respect to the first substrate 10, and the orientation film 16 has porosity. Accordingly, the interface between the orientation film 16 and the liquid crystal layer 50 exists entirely in the thickness direction in the orientation film 16, and thus, it is not easy to offset the antinode S2 of the standing wave S from the interface between the orientation film 16 and the liquid crystal layer 50.

Thus, in this exemplary embodiment, the insulating film 15 appropriate (first insulating film) is interposed between the pixel electrode 9a and the orientation film 16 and thus, the node S1 of the standing wave S is positioned around the center in the thickness direction (z direction) of the orientation film 16, and occurrence of photoreaction in the material constituting the liquid crystal layer 50 at the interface between the orientation film 16 and the liquid crystal layer 50 is suppressed.

More specifically, firstly, a center wavelength of the light source light L incident from the second substrate 20 side is defined as $\lambda$ (nm), a refractive index and a film thickness of the insulating film 15 are defined as $n_1$ and $d_1$, respectively, and a refractive index and a film thickness of the orientation film 16 are defined as $n_0$ and $d_0$, respectively. Furthermore, a penetration depth of the light source light L into the surface of the pixel electrode 9a when the light source light L is reflected at the pixel electrode 9a is defined as $\delta$ (nm), and a refractive index of the pixel electrode 9a is defined as $n_r$. Accordingly, when the following expression (1) is satisfied in a case where m is a positive integer, the node S1 of the standing wave S (section where the power density of the standing wave S is low) is positioned at the center in the thickness direction of the orientation film 16.

$$m\lambda/2 = n_r\delta + n_1 d_1 + (n_0 d_0/2) \quad \text{Expression (1)}$$

In the above expression, the $\delta$ is determined as indicated in a conditional expression described below from a reflectance $\rho$ and an absolute permeability $\mu$ of the pixel electrode 9a, an angular frequency $\omega$ of an optical electric field, and speed c of light in vacuum. In the case of aluminum, the penetration depth $\delta$ of visible light is about 3 nm, and in the case of silver or nickel, the penetration depth $\delta$ of visible light is less than about 3 nm. Accordingly, the $\delta$ is a very small value, and thus, it can be assumed that $n_r\delta = n_1$. Furthermore, assuming that the refractive index $n_1$ of the insulating film 15 is substantially equal to the refractive index $n_0$ of the orientation film 16, $n_1 = n_0$ can hold. As a result, the above conditional expression becomes the following expression (2).

$$m\lambda/2 = n_1(\delta + d_1 + (d_0/2)) \quad \text{Expression (2)}$$

Furthermore, to position the node S1 of the standing wave S in the predetermined range from the center in the thickness direction of the orientation film 16, conditions defined by the following expression (3) are set in this exemplary embodiment. d represents a film thickness from the surface of the pixel electrode 9a to the center in the thickness of the orientation film 16, and $\lambda/8$ set as an acceptable region represents a distance from the node S1 of the standing wave S to an inflection point S3 of the standing wave S.

$$(m\lambda/2) - (\lambda/8) < n_1(\delta + d) < (m\lambda/2) + (\lambda/8) \quad \text{Expression (3)}$$

In the above expression, $d = d_1 + (d_0/2)$.

Therefore, when the following conditional expression is satisfied in a case where m is a positive integer indicating a node number when nodes of the standing wave S are numbered consecutively, the center in the thickness direction of the orientation film 16 is positioned in the acceptable range between inflection points S3 closest to the node S1 as illustrated by arrows M1, M2, M3, ... in FIG. 5. That is, the center in the thickness direction of the orientation film 16 is positioned in the range where the power density of the standing wave S is relatively low. Furthermore, the film thickness of the orientation film 16 is less than λ/4n. Thus, in the thickness direction of the orientation film 16, positioning of the antinode S2 of the standing wave S (section where the power density of the standing wave S is relatively high) at the center in the thickness direction and also at a position offset from the center in the thickness direction can be avoided.

$$\frac{\frac{m\lambda}{2} - \frac{\lambda}{8}}{n} - \delta < d < \frac{\frac{m\lambda}{2} + \frac{\lambda}{8}}{n} - \delta \quad \text{[Expression 3]}$$

in the above expression,
m is a positive integer of 1 or more, $$\delta = \sqrt{\frac{2\rho}{\mu\omega}}$$

ρ represents a reflectance,
μ represents an absolute permeability (H/m),
ω represents an angular frequency (rad/s) of an optical electric field defined by the following expression, $$\omega = \frac{2\pi c}{\lambda}$$

c represents speed of light in vacuum (m/s).

Here, the above-described configuration may be applied to all of the plurality of liquid crystal devices 100 (100 (R), 100 (G), and 100 (B)) used in the projection-type display device 1000. However, photoreaction in the liquid crystal material used for the liquid crystal layer 50 easily occurs in the liquid crystal device 100 (B) configured to receive the light source light of the lowest wavelength region. In the projection-type display device 1000 illustrated in FIG. 1, the liquid crystal device 100 configured to receive the light source light of the lowest wavelength region is the liquid crystal device 100 (B) configured to receive blue light having a wavelength from 420 nm to 450 nm. Accordingly, in this exemplary embodiment, among the plurality of liquid crystal devices 100 (100 (R), 100 (G), and 100 (B)), at least the liquid crystal device 100 (B) configured to receive the light source light of the lowest wavelength region is configured to satisfy the above-described conditional expression. More specifically, liquid crystal devices having the same configuration are used as the plurality of liquid crystal devices 100 (100 (R), 100 (G), and 100 (B)), but the wavelength of the blue light (B) is used as the λ in the above-described conditional expression, and at least the liquid crystal device 100 (B) is configured to satisfy the above-described conditional expression.

For example, in the projection-type display device 1000 illustrated in FIG. 1, a light source configured to emit the light of blue (B) is a solid light source configured to emit the light of blue (B) having a center wavelength of 450 nm. In the liquid crystal device 100, the insulating film 15 includes a single layer of silicon oxide film (SiO₂ (refractive index n=1.43) formed by a CVD method or the like. In this case, to satisfy the above-described conditional expression under condition that m=1, the film thickness d (nm) from the surface of the pixel electrode 9a to the center in the thickness of the orientation film 16 is set as follows.

115 nm<d<193 nm

Accordingly, even in the liquid crystal device 100 (B) configured to receive the light source light of the lowest wavelength region among the plurality of liquid crystal devices 100 (100 (R), 100 (G), and 100 (B)) used in the projection-type display device 1000, occurrence of photoreaction in the material constituting the liquid crystal layer 50 at the interface between the orientation film 16 and the liquid crystal layer 50 can be suppressed, and thus, a light resistance life of the liquid crystal device 100 (B) can be extended.

Furthermore, in this exemplary embodiment, the m in the above-described conditional expression is 1, and thus, the insulating film 15 of the first substrate 10 is thin. Furthermore, the insulating film 25 of the second substrate 20 has the same configuration as the configuration of the insulating film 15 of the first substrate 10, and thus, the insulating film 25 is thin. Accordingly, an electrical field can be applied appropriately from the pixel electrode 9a and the common electrode 21 to the liquid crystal layer 50.

Exemplary Embodiment 2

Figure 7:
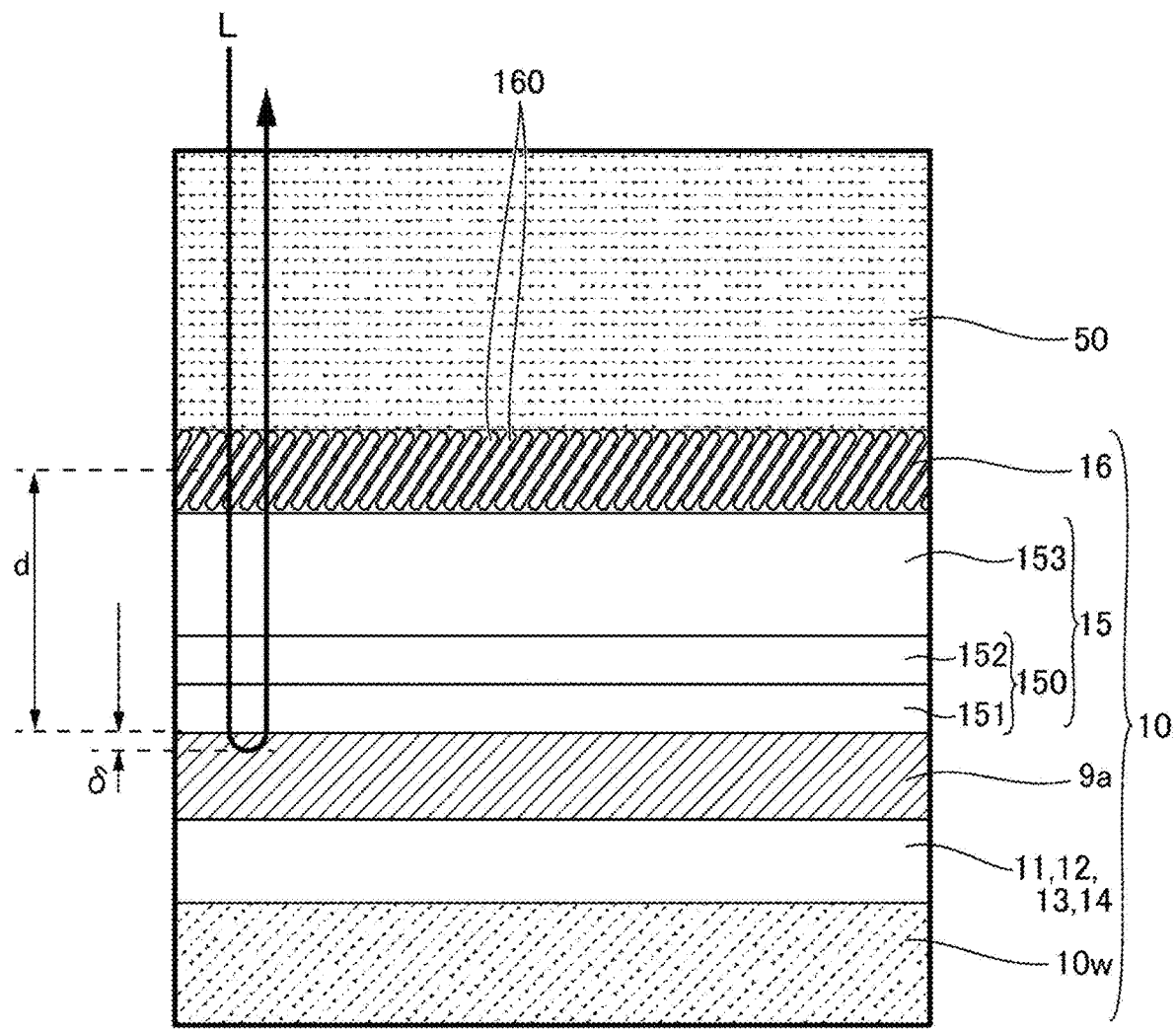
FIG. 7 is an explanatory view schematically illustrating a cross section of a first substrate used in Exemplary Embodiment 2 of the invention.

FIG. 7 is an explanatory view schematically illustrating a cross section of a first substrate 10 used in Exemplary Embodiment 2 of the invention. Basic configurations of this exemplary embodiment and of exemplary embodiments described below are the same as the configuration of Exemplary Embodiment 1, and thus, common portions are denoted by the same reference signs and description of the common portions will be omitted.

As illustrated in FIG. 7, in this exemplary embodiment, as with Exemplary Embodiment 1, in the first substrate 10, a pixel electrode 9a (first electrode), an insulating film 15 (first insulating film) and an orientation film 16 (first orientation film) are laminated in this order. In such a configuration, in Exemplary Embodiment 1, the insulating film 15 includes a single layer of silicon oxide film (SiO₂ (refractive index n=1.43) formed by a CVD method or the like, but in this exemplary embodiment, the insulating film 15 includes a plurality of layers. In this exemplary embodiment, the insulating film 15 is a laminated film including a first layer 151 including a silicon oxide film (SiO₂) formed by a CVD method or the like, a second layer 152 including a silicon nitride film (SiN$_x$ (refractive index n=2.02) formed by a CVD method or the like, and a third layer 153 including a silicon oxide film (SiO₂) formed by a CVD method or the like. In this exemplary embodiment, the first layer 151 and the second layer 152 constitute a reflection enhancing film 150. The insulating film 25 of the second substrate 20 illustrated in FIG. 4 also has the same configuration as the configuration of the insulating film 15.

In such a configuration, a refractive index of an insulating film having the largest film thickness of a plurality of insulating films, an arithmetic mean of respective refractive indices of the plurality of insulating films, or a weighted mean value obtained by weighting the respective refractive indices of the plurality of insulating films with respective thicknesses of the plurality of insulating films is used as the refractive index n of the insulating film 15 in the above-described conditional expression. In this exemplary embodiment, a refractive index (1.43) of the third layer 153 having the largest film thickness of the plurality of insulating films constituting the insulating film 15 is used.

In this exemplary embodiment, as with Exemplary Embodiment 1, liquid crystal devices having the same configuration are used as a plurality of liquid crystal devices 100 (100 (R), 100 (G), and 100 (B)), but a wavelength of blue light (B) is used as the λ in the above-described conditional expression, and at least the liquid crystal device 100 (B) is configured to satisfy the above-described conditional expression.

Specifically, in the projection-type display device 1000 illustrated in FIG. 1, the light source configured to emit the light of blue (B) is a solid light source configured to emit the light of blue (B) having a center wavelength of 450 nm. In this exemplary embodiment, since the insulating film 15 includes the plurality of layers, it is difficult to set m to 1. Accordingly, to satisfy the above-described conditional expression under condition that m=2, a film thickness d (nm) from a surface of the pixel electrode 9a to the center in a thickness direction of the orientation film 16 is set as follows.

$$273 \text{ nm} < d < 350 \text{ nm}$$

Accordingly, even in the liquid crystal device 100 (B) configured to receive the light source light of the lowest wavelength region among the plurality of liquid crystal devices 100 (100 (R), 100 (G), and 100 (B)) used in the projection-type display device 1000, occurrence of photoreaction in a material constituting a liquid crystal layer 50 at an interface between the orientation film 16 and the liquid crystal layer 50 can be suppressed, and thus, a light resistance life of the liquid crystal device 100 (B) can be extended. Furthermore, since the first layer 151 and the second layer 152 constitute the reflection enhancing film 150, intensity of modulated light emitted from the liquid crystal device 100 (B) can be increased. Accordingly, in the projection-type display device 1000, a bright image can be displayed.

Furthermore, in this exemplary embodiment, since the insulating film 15 includes the plurality of layers, it is difficult to set the m to 1, but the m is set to a minimum value (2) in the possible range. Thus, the insulating film 15 of the first substrate 10 is thin. Furthermore, the insulating film 25 of the second substrate 20 has the same configuration as the configuration of the insulating film 15 of the first substrate 10, and thus, the insulating film 25 is thin. Accordingly, an electrical field can be applied appropriately from the pixel electrode 9a and a common electrode 21 to the liquid crystal layer 50.

Exemplary Embodiment 3

Figure 8:
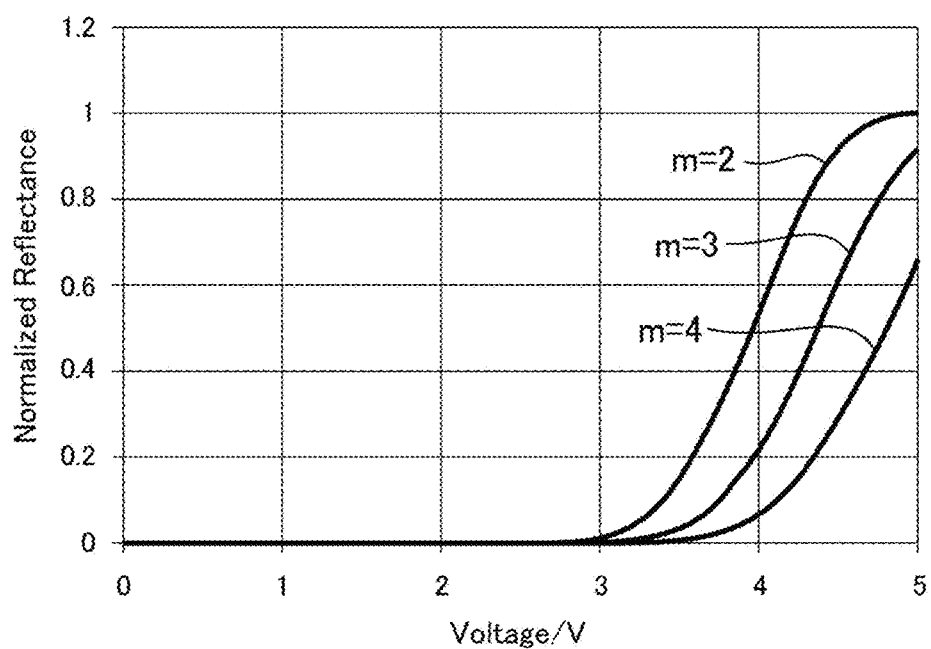
FIG. 8 is an explanatory view illustrating changes in a reflectance of a liquid crystal device when m in a conditional expression is changed to 2, 3, and 4 in the first substrate illustrated in FIG. 7.

FIG. 8 is an explanatory view illustrating changes in a reflectance of a liquid crystal device 100 when m in a conditional expression changes to 2, 3, and 4 in the first substrate 10 illustrated in FIG. 7. A horizontal axis in FIG. 8 represents a voltage applied between a pixel electrode 9a and a common electrode 21. Note that a configuration of the first substrate 10 in this exemplary embodiment is the same as in Exemplary Embodiment 2, and thus, common portions are denoted by the same reference signs and description of the common portions will be omitted. As illustrated in FIG. 7, in this exemplary embodiment, as with Exemplary Embodiments 1 and 2, in the first substrate 10, the pixel electrode 9a (first electrode), an insulating film 15 (first insulating film) and an orientation film 16 (first orientation film) are laminated in this order. As with Exemplary Embodiment 2, the insulating film 15 includes a first layer 151 including a silicon oxide film ($SiO_2$) formed by a CVD method or the like, a second layer 152 including a silicon nitride film ($SiN_x$) formed by a CVD method or the like, and a third layer 153 including a silicon oxide film ($SiO_2$) formed by a CVD method or the like. The insulating film 25 of the second substrate 20 illustrated in FIG. 4 also includes the same configuration as the configuration of the insulating film 15. The first layer 151 and the second layer 152 constitute a reflection enhancing film 150.

In this exemplary embodiment, as with Exemplary Embodiments 1 and 2, liquid crystal devices including the same configuration are used as a plurality of liquid crystal devices 100 (100 (R), 100 (G), and 100 (B)), but a wavelength of blue light (B) is used as the λ in the above-described conditional expression, and at least the liquid crystal device 100 (B) is configured to satisfy the above-described conditional expression.

In this exemplary embodiment, in the projection-type display device 1000 illustrated in FIG. 1, the light source unit 1021 is an extra-high pressure mercury lamp, and light emitted from the light source unit 1021 has wavelength distribution. Such emitted light travels through a dielectric multilayer film filter ($T_{50\%}$=430 nm) as a short wavelength cutoff filter to be incident on the liquid crystal device 100 (B). Accordingly, a center wavelength of light source light incident on the liquid crystal device 100 (B) is 430 nm. In this exemplary embodiment, since the insulating film 15 includes the plurality of layers, it is difficult to set the m to 1. Accordingly, a film thickness d (nm) from a surface of the pixel electrode 9a to the center in a thickness of the orientation film 16 is set to satisfy the above-described conditional expression under condition that the m is 2 or more.

In this case, as the m is greater, a degree of cancellation for each wavelength of influence of the insulating film 15 on light degradation is greater. However, as the m is greater, a thickness of the insulating film 15 increases, and thus, an electrical field applied from the pixel electrode 9a and the common electrode 21 to a liquid crystal layer 50 decreases. As a result, as illustrated in FIG. 8, intensity of reflected light emitted from the liquid crystal devices 100 decreases. Accordingly, in this exemplary embodiment, as for the liquid crystal device 100 (B), to satisfy the above-described conditional expression under condition that m=2, a film thickness d (nm) from the surface of the pixel electrode 9a to the center in the thickness of the orientation film 16 is set as follows.

$$260 \text{ nm} < d < 335 \text{ nm}$$

Accordingly, even in the liquid crystal device 100 (B) configured to receive the light source light of the lowest wavelength region of the plurality of liquid crystal devices 100 (100 (R), 100 (G), and 100 (B)) used in the projection-type display device 1000, occurrence of photoreaction in a material constituting the liquid crystal layer 50 at an interface between the orientation film 16 and the liquid crystal layer 50 can be suppressed, and thus, a light resistance life of the liquid crystal device 100 (B) can be extended. Furthermore, since the first layer 151 and the second layer 152 constitute the reflection enhancing film 150, intensity of modulated light emitted from the liquid crystal device 100 (B) can be increased. Accordingly, in the projection-type display device 1000, a bright image can be displayed. Furthermore, in this exemplary embodiment, since the insulating film 15 includes the plurality of layers, it is difficult to set the m to 1, but the m is set to a minimum value (2) in the possible range. Thus, the insulating film 15 of the first substrate 10 is thin. Furthermore, the insulating film 25 of the second substrate 20 has the same configuration as the configuration of the insulating film 15 of the first substrate 10, and thus, the insulating film 25 is thin. Accordingly, an electrical field can be applied appropriately from the pixel electrode 9a and the common electrode 21 to the liquid crystal layer 50.

Exemplary Embodiment 4

Figure 9:
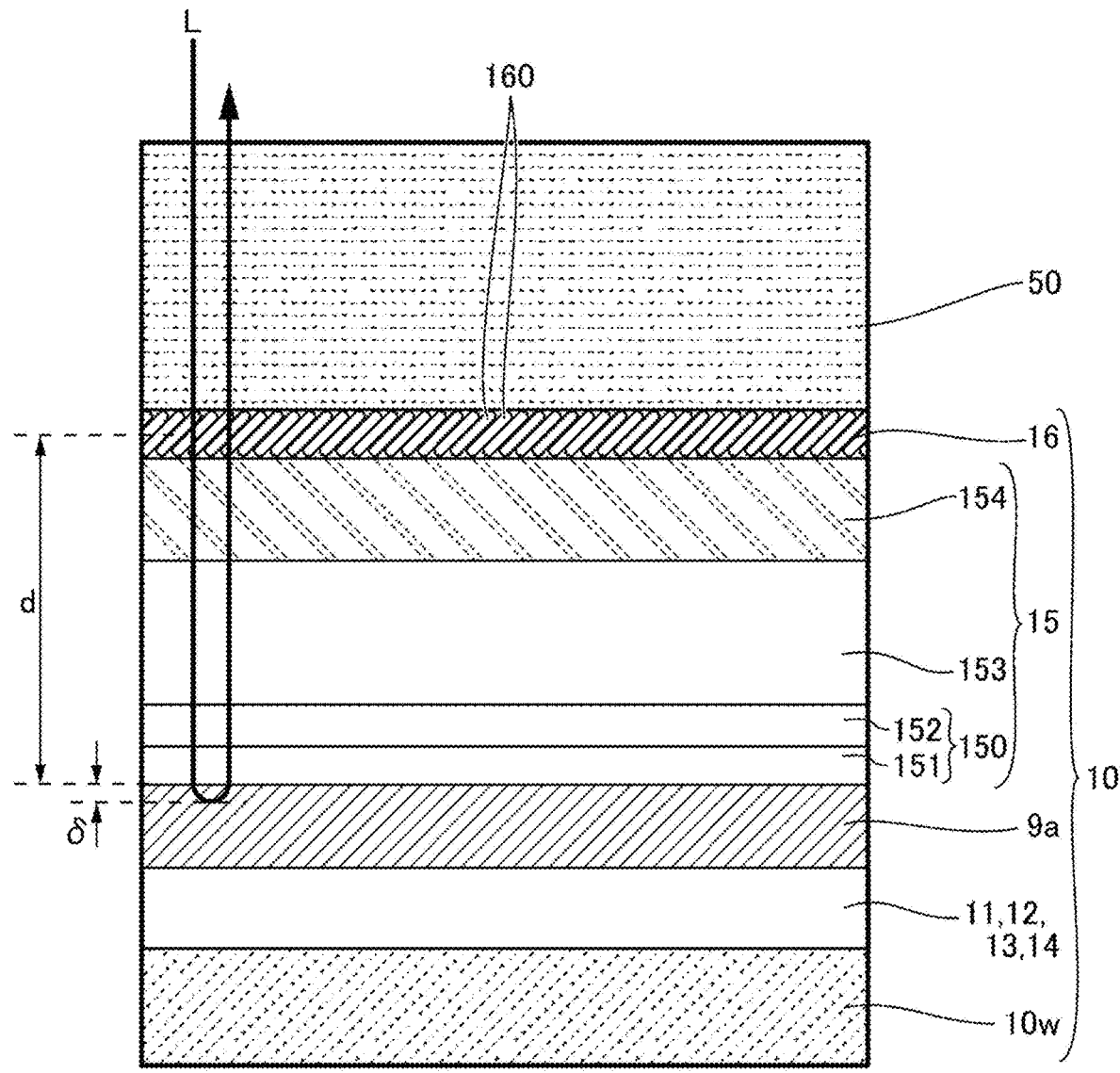
FIG. 9 is an explanatory view schematically illustrating a cross section of a first substrate used in Exemplary Embodiment 4 of the invention.

FIG. 9 is an explanatory view schematically illustrating a cross section of a first substrate 10 used in Exemplary Embodiment 4 of the invention. As illustrated in FIG. 9, in this exemplary embodiment, as with Exemplary Embodiments 1 and 2, in the first substrate 10, a pixel electrode 9a (first electrode), an insulating film 15 (first insulating film) and an orientation film 16 (first orientation film) are laminated in this order. In this exemplary embodiment, as with the Exemplary Embodiments 2 and 3, the insulating film 15 includes a plurality of layers. In this exemplary embodiment, the insulating film 15 includes a first layer 151 including a silicon oxide film ($SiO_2$) formed by a CVD method or the like, a second layer 152 including a silicon nitride film ($SiN_x$) formed by a CVD method or the like, a third layer 153 including a silicon oxide film ($SiO_2$) formed by a CVD method or the like, and a fourth layer 154 including a silicon oxide film ($SiO_2$) formed by a vertical vapor deposition method or the like. The insulating film 25 of the second substrate 20 illustrated in FIG. 4 also includes the same configuration as the configuration of the insulating film 15. The first layer 151 and the second layer 152 constitute a reflection enhancing film 150. The fourth layer 154 constitutes a vertical orientation film. Thus, even when a film thickness of the orientation film 16 including an oblique angle vapor deposition film is as thin as 50 nm, the orientation film 16 exhibits sufficient anchoring strength.

In this exemplary embodiment, as with Exemplary Embodiment 1, liquid crystal devices including the same configuration are used as a plurality of liquid crystal devices 100 (100 (R), 100 (G), and 100 (B)), but a wavelength of blue light (B) is used as the A in the above-described conditional expression, and at least the liquid crystal device 100 (B) is configured to satisfy the above-described conditional expression.

In this exemplary embodiment, in the projection-type display device 1000 illustrated in FIG. 1, a light source configured to emit the light of blue (B) is a solid light source configured to emit the light of blue (B) having a center wavelength of 450 nm. In this exemplary embodiment, since the insulating film 15 includes the plurality of layers, it is difficult to set m to 1. Accordingly, to satisfy the above-described conditional expression under condition that m=2, a film thickness d (nm) from a surface of the pixel electrode 9a to the center in a thickness of the orientation film 16 is set as follows.

$$273 \text{ nm} < d < 350 \text{ nm}$$

Accordingly, even in the liquid crystal device 100 (B) configured to receive light source light of the lowest wavelength region of the plurality of liquid crystal devices 100 (100 (R), 100 (G), and 100 (B)) used in the projection-type display device 1000, occurrence of photoreaction in a material constituting a liquid crystal layer 50 at an interface between the orientation film 16 and the liquid crystal layer 50 can be suppressed, and thus, a light resistance life of the liquid crystal device 100 (B) can be extended. Furthermore, since the first layer 151 and the second layer 152 constitute the reflection enhancing film 150, intensity of modulated light emitted from the liquid crystal device 100 (B) can be increased. Accordingly, in the projection-type display device 1000, a bright image can be displayed.

Furthermore, in this exemplary embodiment, since the insulating film 15 includes the plurality of layers, it is difficult to set the m to 1, but the m is set to a minimum value (2) in the possible range. Thus, the insulating film 15 of the first substrate 10 is thin. Furthermore, the insulating film 25 of the second substrate 20 includes the same configuration as the configuration of the insulating film 15 of the first substrate 10, and thus, the insulating film 25 is thin. Accordingly, an electrical field can be applied appropriately from the pixel electrode 9a and a common electrode 21 to the liquid crystal layer 50.

Other Exemplary Embodiments

In each of the above-described exemplary embodiments, liquid crystal devices including the same configuration are used as the plurality of liquid crystal devices 100 (100 (R), 100 (G), and 100 (B)), and the wavelength of the blue light (B) is used as the λ in the above-described conditional expression. Accordingly, at least the liquid crystal device 100 (B) is configured to satisfy the above-described conditional expression. However, in each of the plurality of liquid crystal devices 100 (100 (R), 100 (G), and 100 (B)), the center wavelength of the incident light source light may be used as the λ in the above-described conditional expression. In such a configuration, the plurality of liquid crystal devices 100 (100 (R), 100 (G), and 100 (B)) each satisfy the above-described conditional expression.

In the above-described exemplary embodiment, the pixel electrode 9a is a reflective electrode and the common electrode 21 is a transmissive electrode, but the invention may be applied to a case where the common electrode 21 is a reflective electrode and the pixel electrode 9a is a transmissive electrode. In this case, the common electrode 21 formed in the second substrate 20 corresponds to the "first electrode" in the invention, the orientation film 26 formed in the second substrate 20 corresponds to the "first orientation film" in the invention, and the insulating film 25 formed between the common electrode 21 (first electrode) and the orientation film 26 in the second substrate 20 corresponds to the "first insulating film". Furthermore, the pixel electrode 9a having light transmissivity and formed in the first substrate 10 corresponds to the "second electrode" in the invention, the orientation film 16 formed in the first substrate 10 corresponds to the "second orientation film" in the invention, and the insulating film formed between the pixel electrode 9a (second electrode) and the orientation film 16 in the first substrate 10 corresponds to the "second insulating film".

Other Display Apparatus

The display device including the liquid crystal device 100 to which the invention is applied is not limited to the projection-type display device 1000 of each of the above-described exemplary embodiments. For example, the invention may be applied to a display device such as a projection-type HUD (head up display).

The entire disclosure of Japanese Patent Application No. 2017-218828, filed Nov. 14, 2017 is expressly incorporated by reference herein.

What is claimed is:
1. A display device comprising:
a light source unit configured to emit light source light;

a plurality of liquid crystal devices of a reflection type each configured to receive the light source light of a different wavelength region; and an optical system configured to compose and project modulated light emitted from the plurality of liquid crystal devices, wherein among the plurality of liquid crystal devices, at least a liquid crystal device configured to receive the light source light of the lowest wavelength region includes a first substrate in which a first electrode having reflectivity, a first insulating film that is a laminated film including a plurality of insulating films, and a first orientation film including an oblique angle vapor deposition film are laminated in this order, a second substrate in which a second electrode having light transmissivity and a second orientation film are laminated in this order on a side facing the first electrode, and a liquid crystal layer provided between the first substrate and the second substrate, and a wavelength λ, a refractive index n, a penetration depth δ, and a film thickness d satisfy a conditional expression, $$\frac{\frac{m\lambda}{2} - \frac{\lambda}{8}}{n} - \delta < d < \frac{\frac{m\lambda}{2} + \frac{\lambda}{8}}{n} - \delta$$

m is 2

$$\delta = \sqrt{\frac{2\rho}{\mu\omega}}$$

ρ represents a reflectance,
μ represents an absolute permeability (H/m),
ω represents an angular frequency (rad/s) of an optical electric field defined by the following expression, $$\omega = \frac{2\pi c}{\lambda}$$

c represents speed of light (m/s) in a vacuum, where λ (nm) represents a center wavelength of the light source light incident from the second substrate side, n represents a refractive index of the first insulating film having the largest film thickness of the plurality of insulating films or an arithmetic mean of respective refractive indices of the plurality of insulating films, δ (nm) represents a penetration depth of the light source light into a surface of the first electrode when the light source light is reflected at the first electrode, and d (nm) represents a film thickness from the surface of the first electrode to a center in a thickness of the first orientation film, the first insulating film includes a first insulating layer, a second insulating layer, and a third insulating layer, the second insulating layer is disposed between the first insulating layer and the third insulating layer, the second insulating layer is made of silicon nitride, and the first insulating layer and the third insulating layer are made of silicon oxide.

2. The display device according to claim 1, wherein the plurality of insulating films include a plurality of insulating films constituting a reflection enhancing film.

3. The display device according to claim 1, wherein the light source unit includes a light source other than a single wavelength light source or other than a substantially single wavelength light source.

4. The display device according to claim 1, wherein a film thickness of the first orientation film is less than λ/4n.

5. The display device according to claim 4, wherein the first insulating film includes an orientation film including a vertical orientation film.

6. The display device according to claim 1, wherein the plurality of liquid crystal devices each satisfy the conditional expression.

7. The display device according to claim 1, wherein the second substrate includes the second electrode, a second insulating film, and the second orientation film laminated in this order, the second insulating film includes the same configuration as a configuration of the first insulating film, and the second orientation film includes the same configuration as a configuration of the first orientation film.

* * * * *